US012700285B2

(12) United States Patent
Nelson et al.

(10) Patent No.: US 12,700,285 B2
(45) Date of Patent: Aug. 4, 2026

(54) SITUATIONAL BONUS EVENTS ASSOCIATED WITH GAMING ESTABLISHMENT TICKET VOUCHERS

(71) Applicant: IGT, Las Vegas, NV (US)

(72) Inventors: Dwayne Nelson, Las Vegas, NV (US); Kevin Higgins, Reno, NV (US); Robert Silva, Reno, NV (US)

(73) Assignee: IGT, Las Vegas, NV (US)

( * ) Notice: Subject to any disclaimer, the term of this patent is extended or adjusted under 35 U.S.C. 154(b) by 337 days.

(21) Appl. No.: 18/373,045

(22) Filed: Sep. 26, 2023

(65) Prior Publication Data

US 2025/0104522 A1 Mar. 27, 2025

(51) Int. Cl.
*G07F 17/32* (2006.01)
*G07F 17/42* (2006.01)

(52) U.S. Cl.
CPC ...... *G07F 17/3267* (2013.01); *G07F 17/3244* (2013.01); *G07F 17/42* (2013.01)

(58) Field of Classification Search
CPC .. C07F 17/3267; C07F 17/3244; C07F 17/42; G06Q 20/387; G06Q 30/0207
USPC ........................................................ 463/25
See application file for complete search history.

(56) References Cited

U.S. PATENT DOCUMENTS

| | | | | |
|---|---|---|---|---|
| 6,056,289 | A | 5/2000 | Clapper | |
| 7,988,550 | B2 | 8/2011 | White | |
| 8,137,187 | B2 | 3/2012 | Walker et al. | |
| 8,177,624 | B2 | 5/2012 | Graham et al. | |
| 8,550,901 | B2 | 10/2013 | Walker et al. | |
| 8,613,659 | B2 | 12/2013 | Nelson et al. | |
| 8,777,729 | B2 | 7/2014 | Belger et al. | |
| 10,198,906 | B2 | 2/2019 | Walker et al. | |
| 10,235,838 | B2 | 3/2019 | Tsutsui | |
| 2008/0248865 | A1 | 10/2008 | Tedesco et al. | |
| 2017/0011593 | A1* | 1/2017 | Palermo | G07F 17/3223 |
| 2021/0035409 | A1 | 2/2021 | Higgins et al. | |
| 2021/0209897 | A1* | 7/2021 | Seaton | G07F 17/3244 |

* cited by examiner

*Primary Examiner* — Pierre E Elisca
(74) *Attorney, Agent, or Firm* — Neal, Gerber & Eisenberg LLP

(57) ABSTRACT

Systems and methods that offer zero, one or more bonus events in association with a procurement and/or a redemption of a ticket voucher associated with an amount of funds.

20 Claims, 7 Drawing Sheets

SITUATIONAL BONUS EVENTS ASSOCIATED WITH GAMING ESTABLISHMENT TICKET VOUCHERS

CROSS-REFERENCE TO RELATED APPLICATIONS

This application is related to the following commonly owned co-pending patent applications: U.S. application Ser. No. 18/373,054, entitled "BONUS EVENTS ASSOCIATED WITH GAMING ESTABLISHMENT TICKET VOUCHERS"; and U.S. application Ser. No. 18/373,029, entitled "DIFFERENT FUND TYPES FOR BONUS EVENTS OFFERED FROM REDEMPTIONS OF GAMING ESTABLISHMENT TICKET VOUCHERS".

BACKGROUND

In various embodiments, the systems and methods of the present disclosure offer zero, one or more bonus events in association with a procurement and/or a redemption of a gaming establishment ticket voucher and the situation surrounding the procurement and/or the redemption.

Gaming machines may provide players awards in primary games. Gaming machines generally require the player to place a wager of cashable credits to activate the primary game. The award of cashable credits may be based on the player obtaining a winning symbol or symbol combination and on the amount of the wager.

BRIEF SUMMARY

In certain embodiments, the present disclosure relates to a system including a processor, and a memory device that stores a plurality of instructions. When executed by the processor responsive to a receipt of data associated with a request to issue a ticket voucher associated with a first amount of funds and responsive to a determination to associate a bonus event with the ticket voucher, the instructions cause the processor to determine a benefit, cause a database to store, in association with the ticket voucher, data associated with each of the bonus event and the first amount of funds, and cause the ticket voucher to be issued. When executed by the processor responsive to the receipt of data associated with the request to issue the ticket voucher associated with the first amount of funds and responsive to no determination to associate any bonus event with the ticket voucher, the instructions of these embodiments cause the processor to cause the database to store data associated the first amount of funds in association with the ticket voucher, and cause the ticket voucher to be issued.

In certain embodiments, the present disclosure relates to a system including a processor, and a memory device that stores a plurality of instructions. When executed by the processor responsive to a receipt of data associated with a request to issue a ticket voucher associated with a first amount of funds and responsive to a determination to associate a bonus event with the ticket voucher and a satisfaction of a condition independent of the determination to associate the bonus event with the ticket voucher, the instructions cause the processor to determine a benefit, cause a database to store, in association with the ticket voucher, data associated with each of the bonus event and the first amount of funds, and cause the ticket voucher to be issued. When executed by the processor responsive to the receipt of data associated with the request to issue the ticket voucher associated with the first amount of funds and responsive to the determination to associate the bonus event with the ticket voucher and no satisfaction of the condition, the instructions of these embodiments cause the processor to cause the database to store data associated the first amount of funds in association with the ticket voucher, and cause the ticket voucher to be issued.

In certain embodiments, the present disclosure relates to a method of operating a system. In these embodiments, responsive to a receipt of data associated with a request to issue a ticket voucher associated with a first amount of funds and responsive to a determination to associate a bonus event with the ticket voucher, the method includes determining, by a processor, a benefit, causing a database to store, in association with the ticket voucher, data associated with each of the bonus event and the first amount of funds, and causing the ticket voucher to be issued. Responsive to the receipt of data associated with the request to issue the ticket voucher associated with the first amount of funds and responsive to no determination to associate any bonus event with the ticket voucher, the method includes causing the database to store data associated the first amount of funds in association with the ticket voucher, and causing the ticket voucher to be issued.

Additional features are described herein, and will be apparent from the following Detailed Description and the figures.

DETAILED DESCRIPTION

Figure 1:
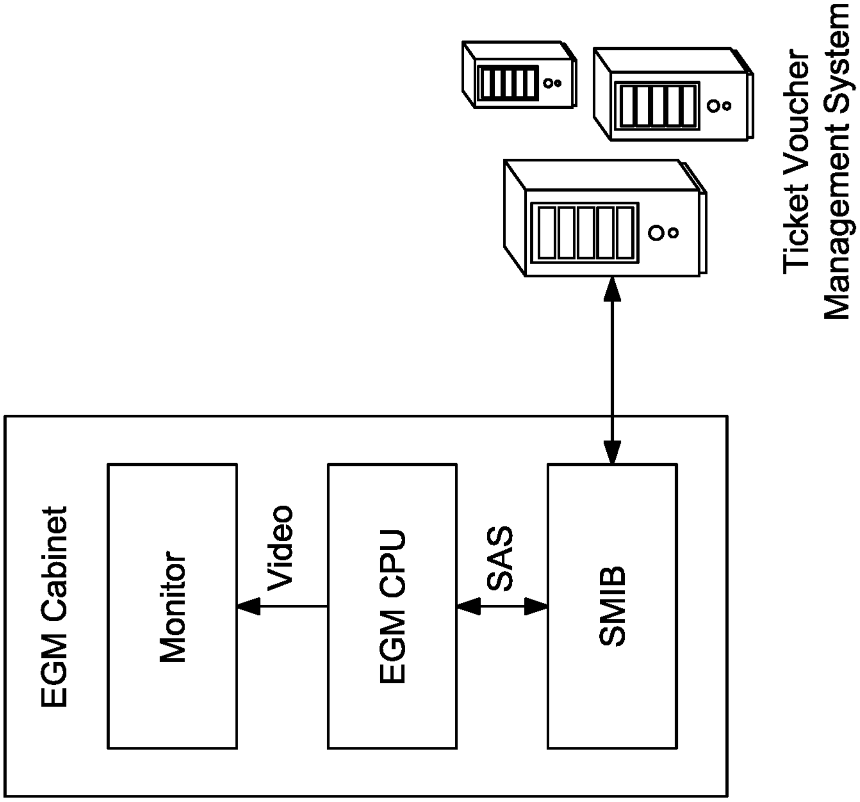
FIG. 1 is an example configuration of the architecture of a plurality of different components of the system of the present disclosure

In various embodiments, the systems and methods of the present disclosure offer zero, one or more bonus events in association with a procurement and/or a redemption of a gaming establishment ticket voucher and the situation surrounding the procurement and/or the redemption.

In certain embodiments, in association with a user procuring a ticket voucher (e.g., an anonymous bearer instrument associated with an amount of funds and redeemable for cash via a kiosk, a cashier and/or game play on a gaming establishment device, such as an electronic gaming machine ("EGM")), the system determines any bonus events to associate with that ticket voucher. In these embodiments, upon a player at a gaming establishment device, such as an EGM, making one or more inputs to convert an amount of funds of a balance of the gaming establishment device to a ticket voucher, the system determines whether or not to associate a bonus event with that ticket voucher. In such embodiments, the system determines whether or not to associate any bonus events (or potential bonus events) with the ticket voucher based on certain factors associated with obtaining the ticket voucher. In different embodiments, based on one or more factors, including, but not limited to, an amount of funds associated with the ticket voucher, an identity of a holder of the ticket voucher, the gaming establishment device that the ticket voucher is being issued from and/or a satisfaction of one or more conditions, the system determines whether or not to associate a bonus event (or a potential bonus event) with the issued ticket voucher. For example, following a determination that a player at an EGM makes one or more inputs to obtain a ticket voucher following a relatively negative experience at the EGM (e.g., the player has cashed out a credit balance of the EGM to a ticket voucher after losing at least a threshold quantity of games in a row), the system determines to associate a bonus event with the ticket voucher.

In various embodiments, following an attempted redemption of a ticket voucher, the system determines whether to trigger a bonus event with the attempted ticket voucher redemption. In certain embodiments, the system determines whether to trigger a bonus event previously associated with the ticket voucher attempted to be redeemed. In certain embodiments, the system determines whether to trigger a bonus event not previously associated with the ticket voucher attempted to be redeemed. In these different embodiments, upon an attempted redemption of a ticket voucher in exchange for an increase of a credit balance at a gaming establishment device, such as an EGM, the system determines whether or not a bonus event occurs in association with the redemption of that ticket voucher. In different embodiments, the system determines whether or not a bonus event occurs based on certain factors associated with redeeming the ticket voucher. In such embodiments, based on one or more factors, including, but not limited to, an amount of funds associated with the ticket voucher, an identity of a holder of the ticket voucher, the gaming establishment device that the ticket voucher is attempted to be redeemed at and/or a satisfaction of one or more conditions, the system determines whether or not to cause a bonus event to occur in association with the redemption of the ticket voucher. For example, following a determination that a ticket voucher attempted to be redeemed at an EGM is associated with an amount of funds at least equal to a threshold amount, the system randomly determines to trigger a bonus event in association with the redemption of that ticket voucher.

In certain embodiments, following the system determining to associate a ticket voucher with a bonus event as part of a ticket voucher procurement and/or the system determining to trigger a bonus event as part of a ticket voucher redemption, the system determines one or more parameters of the bonus event. In such embodiments, the system determines zero, one or more attributes of the bonus event based on zero, one or more attributes of the procurement of that ticket voucher and/or zero, one or more attributes of the redemption of that ticket voucher. That is, certain events that occur (or do not occur) in association with the procurement and/or redemption of a ticket voucher may factor into the benefit, if any, realized when that ticket voucher is redeemed. In different embodiments, based on one or more factors, including, but not limited to, an amount of funds associated with the ticket voucher, an identity of a holder of the ticket voucher, when the ticket voucher is attempted to be redeemed, and/or a satisfaction of one or more conditions, the system determines an amount that the ticket voucher is redeemable for (which may differ from the amount of funds associated with the ticket voucher) and/or one or more supplemental benefits that the ticket voucher is redeemable for. For example, following a determination that a point in time when a ticket voucher is attempted to be redeemed at an EGM is within a predetermined period of time (i.e., a satisfaction of a redemption condition), the system offers the holder of the ticket voucher the option to redeem the ticket voucher for double the amount of funds associated with the ticket voucher if such a doubled amount of funds take the form of non-cashable credits (i.e., credits that may be used to establish a balance of a gaming establishment device, such as an EGM, but cannot be directly cashed out to a ticket voucher and rather must be initially used for game play (or other gaming function) at the gaming establishment device).

Such a configuration of offering zero, one or more benefits in association with the employment of ticket vouchers provides a relatively more secure environment for a user (via reducing or eliminating a user carrying cash on their person and thus diminishing the risks that such cash may be lost or stolen) and overcomes various health concerns associated with cash-based transactions (e.g., protecting patrons from using forms of currency that act as transmission vehicles for contagions). Moreover, a reduction in cash-based transactions reduces computational resources otherwise dedicated to sorting, counting and processing such cash, leading to energy savings as components tasked with sorting, counting and processing such cash are used less. Accordingly, since certain gaming establishment patrons are uncomfortable with large amounts of cash in a gaming establishment, the system incentivizes the use of ticket vouchers (without the need to handle cash) thereby realizing various advantages not available from prior systems.

In various embodiments, a system of the present disclosure includes (or is otherwise in communication with) various components or sub-systems operating together to offer zero, one or more benefits in association with the use of zero, one or more ticket vouchers. In certain embodiments, such as seen in FIG. 1, the system is in communication with one or more gaming establishment devices, such as one or more EGMs (e.g., a slot machine, a video poker machine, a video lottery terminal, a terminal associated with an electronic table game, a terminal associated with a live table game, a video keno machine, a video bingo machine, a historical horse racing terminal and/or a sports betting terminal (offering sports betting opportunities and, in certain instances, wagering games)) operable to issue a ticket voucher for an amount corresponding to a cashed out credit balance of the EGM and/or receive a ticket voucher for an increase of a credit balance of the EGM; one or more ticket voucher redemption kiosks operable to receive a ticket voucher and dispense an amount of currency; and/or one or more retail point-of-sale terminals operable to receive a ticket voucher at part of a payment for a product and/or service.

In certain embodiments, the system is in communication with a distinct and independently operating ticket voucher system. In certain embodiments, as seen in FIG. 1, the system includes a ticket voucher system. In these different embodiments, the ticket voucher system includes one or more servers which store, in one or more databases, ticket voucher identification information associated with each ticket voucher created by the ticket voucher system, such as identifying information, value information, and/or activity information. In certain embodiments, each ticket voucher includes or is otherwise associated with different identifying information which is identifiable to a holder of the ticket voucher, such as a ticket voucher validation number, and an amount of funds associated with the ticket voucher. In different embodiments, the ticket voucher database and/or the ticket voucher includes or is otherwise associated with various fields of ticket voucher identifying information including, but not limited to: (i) a primary key (i.e., an index for a record in a table); (ii) a ticket voucher validation number (i.e., the validation number associated with the issued ticket); (iii) a ticket state (e.g., a state of a ticket as being in an issued state or a redeemed state); (iv) an issuance date/time (i.e., the date/time when the ticket voucher was issued); (v) a property address associated with the ticket voucher issuance; (vi) an amount of funds associated with the ticket voucher; (vii) any expiration date associated with the ticket voucher; (viii) a device identification associated with the issuance of the ticket voucher; (ix) an image of the ticket voucher (e.g., an image of a front of the ticket voucher and/or an image of a back of the ticket voucher); (x) any redemption date (i.e., the date the ticket voucher was redeemed at (if the ticket voucher is in the redeemed state)); (xi) redeemed at (i.e., the device where the ticket voucher was redeemed (if the ticket voucher is in the redeemed state)); (xii) a data signature (i.e., a signature of the data associated with the ticket voucher to prevent tampering by casino employees); (xiii) a machine identification (i.e., an asset or machine number of the device that printed the ticket voucher); (xiv) any bonus events associated with the ticket voucher; (xv) any bonus events triggered in association with the ticket voucher; and/or (xvi) the benefit realized from the bonus event triggered in association with the ticket voucher.

In addition to maintaining information associated with each ticket voucher, in certain embodiments wherein the ticket voucher takes the form of a paper ticket voucher, the ticket voucher system includes one or more ticket voucher system components, such as a ticket voucher printer configured to print paper ticket vouchers and/or a ticket voucher acceptor configured to receive paper ticket vouchers. For example, a ticket voucher printer is associated with a gaming establishment device that prints ticket vouchers. In certain other embodiments wherein a ticket voucher takes the form of a virtual ticket voucher, the ticket voucher system includes one or more interfaces operable to communicate, to a mobile device, data associated with a virtual ticket voucher. It should be appreciated that in different embodiments, the system utilizes a mobile device running a mobile device application, a kiosk, a gaming establishment device (e.g., an EGM), an externally controlled interface (e.g., a service window displayed by an EGM or by a display device associated with a slot machine interface board ("SMIB")), and/or a gaming establishment interface, such as a casino desk, to interface with one or more users to facilitate interactions with the system and/or the ticket voucher system.

In various embodiments, in association with a user obtaining one or more ticket vouchers, such as upon a user of an EGM cashing out a credit balance in exchange for a ticket voucher associated with an amount of funds of the cashed out credit balance, the system determines whether to associate a bonus event with that ticket voucher. In certain embodiments, the system determines whether to associate (or not associate) a bonus event with an obtained ticket voucher based on one or more displayed events or elements (or the lack of one or more displayed events or elements). In certain embodiments, the system determines whether to associate (or not associate) a bonus event with an obtained ticket voucher independent of any displayed events or elements. In certain of these embodiments, since the bonus event does not take place until the ticket voucher is subsequently redeemed (or at another point in time), the system determines whether to associate a bonus event with the issued ticket voucher prior to providing any benefit of such a bonus event.

In certain embodiments, if the system associates a bonus event with a ticket voucher when that ticket voucher is obtained, the system causes the ticket voucher to include certain information associated with the potential bonus event. For example, a ticket voucher associated with a value of $1,000 may include information such as "Worth $1,100 tomorrow in the high denomination area". In certain embodiments, if the system associates a bonus event with a ticket voucher when that ticket voucher is obtained, the system additionally or alternatively causes information associated with the potential bonus event to be available to the holder of the ticket voucher. In certain such embodiments, since the expected worth of the bonus event of a ticket voucher may not be possible to be displayed (e.g., the system determines a value provided as a bonus event when the ticket voucher is redeemed), the holder of the ticket voucher learns about certain potential aspects of the bonus event by the system sending an electronic message to the holder of the ticket voucher (e.g., text/SMS message, an e-mail and/or a notification to a mobile application being executed by a mobile device). In another embodiment, the system utilizes an externally controlled interface, such as a service window displayed by an EGM or by a display device associated with a component of a gaming establishment patron management system (e.g., a SMIB), to display information about certain potential aspects of the bonus event. In another embodiment, the holder of the ticket voucher learns about certain potential aspects of the bonus event by the system associating such information with a machine readable code printed on a physical ticket voucher (or otherwise displayed on an image of a virtual ticket voucher). In this embodiment, upon scanning the machine readable code, such as with a mobile device executing a mobile device application associated with the system, the system causes a display of such information, such as via causing the mobile device to display such information. In another embodiment, the holder of the ticket voucher learns about certain potential aspects of the bonus event responsive to the ticket voucher being received by a gaming establishment device, such as a kiosk, that displays such information to the holder of the ticket voucher. In these different embodiments, any relevant information, such as when and for what amount the bonus event may potentially include as well as any conditions that need to be satisfied to realize the bonus event, may be included in any messaging displayed to or sent to the holder of the ticket voucher.

In various embodiments, in addition to or alternative from potentially associating a bonus event with a ticket voucher when that ticket voucher is obtained, the system determines whether to trigger a bonus event when that ticket voucher is attempted to be redeemed. In certain embodiments, the system determines whether to trigger (or not trigger) a bonus event with a ticket voucher attempted to be redeemed based on one or more displayed events or elements (or the lack of one or more displayed events or elements). In certain embodiments, the system determines whether to trigger (or not trigger) a bonus event with a ticket voucher attempted to be redeemed independent of any displayed events or elements. In these embodiments, rather than determining whether to associate a bonus event with a ticket voucher for subsequent triggering when the ticket voucher is redeemed, the system determines whether to trigger one or more bonus events as part of the redemption of that ticket voucher.

It should be appreciated that while described as associating a bonus event with a ticket voucher when that ticket voucher is issued and potentially triggering a bonus event when a ticket voucher is redeemed, in different embodiments, the system determines whether to associate a bonus event with a ticker voucher and/or trigger a bonus event in association with a ticket voucher when the ticket voucher is issued, when the ticket voucher is redeemed or at any point in between. That is, at one or more points in time and responsive to one or more event occurring (or not occurring), the system determines whether to associate a bonus event with a ticket voucher for a subsequent triggering of that bonus event, whether to trigger a bonus event previously associated with a ticket voucher and/or whether to trigger a bonus event with a ticket voucher not previously associated with any bonus events.

In certain embodiments, the system randomly determines whether to associate a bonus event (to be potentially subsequently triggered) with a ticket voucher. In certain embodiments, the system randomly determines whether to potentially trigger, subject to zero, one or more conditions being satisfied, a bonus event previously associated with a ticket voucher. In certain embodiments, the system randomly determines whether to potentially trigger, subject to zero, one or more conditions being satisfied, a bonus event with a ticket voucher not previously associated with any bonus events.

In certain embodiments, the system determines whether to associate a bonus event (to be potentially subsequently triggered) with a ticket voucher based on one or more bonus event triggering factors. In certain embodiments, the system determines whether to potentially trigger, subject to zero, one or more conditions being satisfied, a bonus event previously associated with a ticket voucher based on one or more bonus event triggering factors. In certain embodiments, the system determines whether to potentially trigger, subject to zero, one or more conditions being satisfied, a bonus event with a ticket voucher not previously associated with any bonus events based on one or more bonus event triggering factors. In these different embodiments, such bonus event triggering factors that influence whether or not to associate a bonus event with a ticket voucher and/or potentially trigger a bonus event in association with a ticket voucher include, but are not limited to, one or more of: a value of the ticket voucher (e.g., a bonus event is triggered for ticket vouchers valued at more than $1,000), a time factor (e.g., a bonus event is triggered based on a certain time of day, a certain day of the week and/or a certain number of days since the player visited the gaming establishment), a player identity factor (e.g., a bonus event is triggered for ticket vouchers held by players logged into one or more systems), a player tracking status factor (e.g., a bonus event is triggered for ticket vouchers held by player's have a player tracking status above a threshold level), an associated account factor (e.g., a bonus event is triggered for ticket vouchers held by users associated with one or more cashless wagering accounts, sporting event wagering accounts and/or gaming establishment retail accounts), a wagering history factor (e.g., a bonus event is triggered for ticket vouchers associated with a certain level of game play, such as $5,000 wagered in an hour), and/or a promotional factor (e.g., a bonus event is triggered for ticket vouchers held by players that qualify for a promotion being run by an operator of a gaming establishment).

In certain embodiments, if the system determines not to associate a bonus event with a ticket voucher when that ticket voucher is issued, the system stores (or causes a ticket voucher system to store) the above-described ticket voucher identifying information in the ticket voucher database and awaits a redemption of that ticket voucher. In these embodiments, since a bonus event may still be triggered when that ticket voucher is redeemed, the lack of an association of a bonus event with a ticket voucher does not preclude a bonus event subsequently occurring with that ticket voucher. However, if the system determines not to trigger a bonus event with such a ticket voucher when that ticket voucher is redeemed, the system utilizes (or causes a ticket voucher system to utilize) the above-described ticket voucher identifying information in the ticket voucher database to redeem that ticket voucher without triggering any bonus event.

In certain embodiments, if the system determines to potentially trigger a bonus event previously associated with a ticket voucher and/or determines to potentially trigger a bonus event with a ticket voucher not previously associated with any bonus events, the system determines if any conditions are associated with the triggering of the bonus event. In these embodiments, if the system determines that no conditions are associated with the triggering of the bonus event, the system proceeds with triggering the bonus event in association with the ticket voucher. On the other hand, if the system determines that one or more conditions are associated with the triggering of the bonus event, the system determines whether such conditions are satisfied. In these embodiments, the system determines whether or not the bonus event is eligible to occur in association with the redemption of a ticket voucher based on one or more factors associated with the redemption of the ticket voucher. If such conditions are satisfied when the ticket voucher is redeemed, the system proceeds with triggering the bonus event in association with the ticket voucher. If such conditions are not satisfied when the ticket voucher is redeemed, the system determines not to trigger the bonus event and utilizes (or causes a ticket voucher system to utilize) the above-described ticket voucher identifying information in the ticket voucher database to redeem that ticket voucher without triggering any bonus event In certain embodiments, a condition associated with the triggering of a bonus event relates to a period of time when the ticket voucher is redeemed. In these embodiments, redeeming the ticket voucher during an eligible period of time results in a satisfaction of the condition associated with the triggering of the bonus event and redeeming the ticket voucher outside the eligible period of time results in the condition associated with the triggering of the bonus event not being satisfied.

In certain embodiments, a condition associated with the triggering of a bonus event relates to the gaming establishment device, such as the EGM or redemption kiosk, where the ticket voucher is redeemed. In these embodiments, redeeming the ticket voucher at an eligible gaming establishment device, such as an eligible EGM or redemption kiosk, results in a satisfaction of the condition associated with the triggering of the bonus event and redeeming the ticket voucher at an ineligible gaming establishment device, such as an ineligible EGM or redemption kiosk, results in the condition associated with the triggering of the bonus event not being satisfied. In different embodiments, the system determines if a gaming establishment device is eligible (or determines if the gaming establishment device is ineligible) based on one or more of a configuration of the gaming establishment device (e.g., an EGM of a certain game theme, such as a relatively new game, is eligible but an EGM of another game theme is ineligible), a manufacturer of the gaming establishment device, a location of the gaming establishment device (e.g., an EGM in a high roller area is eligible but an EGM located in a casino bar is ineligible; an EGM in a gaming establishment being run by a multi-site operator is eligible but an EGM in a gaming establishment being run by a single-site operator is ineligible), an operational configuration of the gaming establishment device (e.g., an EGM of a certain denomination, progressive award association, activated feature, paytable employed, and/or game state is eligible but an EGM of another denomination, another progressive award association, another (or no) activated feature, another paytable employed, and/or another game state is ineligible), a player tracking card status of the gaming establishment device (e.g., an EGM associated with a card-in status is eligible but an EGM not associated with a card-in status is ineligible), and/or a type of the gaming establishment device (e.g., an EGM is eligible but a redemption kiosk is ineligible).

In certain embodiments, a condition associated with the triggering of a bonus event relates to the user redeeming the ticket voucher. In these embodiments, an eligible user associated with redeeming the ticket voucher results in a satisfaction of the condition associated with the triggering of the bonus event and an ineligible user associated with redeeming the ticket voucher results in the condition associated with the triggering of the bonus event not being satisfied. In different embodiments, the system determines if a user is eligible (or determines if the user is ineligible) based on one or more of a wagering history of the user (e.g., a user that has wagered at least a threshold amount over a period of time is eligible but a user that has wagered less than the threshold amount is ineligible), whether the user is associated with one or more accounts (e.g., a user associated with a cashless wagering account, a sporting event wagering account or a gaming establishment retail account is eligible but a user not associated with a cashless wagering account, a sporting event wagering account and/or a gaming establishment retail account is ineligible), and/or a status of the user (e.g., a user of at least a threshold player tracking status is eligible but a user of less than the threshold player tracking status is ineligible).

In certain embodiments, the system utilizes a combination of different conditions such that a ticket voucher is only bonused in certain redemptions situations. In these embodiments, the employment of one or more conditions prevents or otherwise deters cheating by certain individuals looking to defraud the gaming establishment. In one such embodiment, to avoid cheating, the system tracks player activity and only offers the player the bonus event in association with a ticket voucher if a condition is satisfied with that tracked player, such as after a relatively long session and/or once a day. This avoids players attempting to create many ticket vouchers to obtain many bonus events. In another embodiment directed to preventing potential cheating, the system does not associate the ticket voucher with any benefit via a bonus event until after a certain amount of time has elapsed since the player played (e.g., one day after a gaming session that resulted in the ticket voucher), after the player completed one or more activities (e.g., after the player has checked out of their hotel room) and/or after a certain amount of player inactivity on the casino floor (e.g., after one day of gaming inactivity).

In certain embodiments in which the system curbs attempted cheating by applying certain redemption conditions, the system rejects the ticket voucher if the currently carded player does not match the player account for which the ticket voucher was generated. In another embodiment, the system operates such that a player who inserts a ticket voucher associated with a bonus event is not eligible to redeem the benefit of the bonus event if the player does not have an active player session associated with the player previously associated with the ticket voucher when it was issued. In such an embodiment, the ticket voucher is still redeemable for its face value amount, but not for any bonus amount associated with any bonus event. In another embodiment, the system prevents the redemption of the ticket voucher associated with a bonus event (at certain gaming establishment devices) if the player who inserts the ticket voucher associated with the bonus event is a different player than the player previously associated with the issuance of the ticket voucher.

In certain embodiments, if the system determines that any conditions associated with a bonus event are satisfied and determines to trigger a bonus event previously associated with a ticket voucher and/or trigger a bonus event with a ticket voucher not previously associated with any bonus events, the system determines one or more parameters of the bonus event. Such parameters establish how the bonus event will be provided, what the bonus event will entail and any other features or functionality of the bonus event.

In certain embodiments, the parameter of the bonus event includes an amount of additional funds to associate with the ticket voucher (such that the amount of funds received for redeeming the ticket voucher what may be more than the amount of funds associated with the ticket voucher stored by in the ticket voucher database). In certain such embodiments, the amount of additional funds available in association with the ticket voucher includes a static award, such as a static amount of credits, a static quantity of player tracking points, a static player tracking point modifier applicable to a quantity of player tracking points subsequently earned by the user, a static player tracking point modifier applicable to a quantity of player tracking points previously earned by the user, a static quantity of non-cashable promotional credits usable to fund one or more plays of one or more games of chance, and/or a static quantity of virtual credits usable for a play of a social or non-wagering game.

In certain embodiments, the system randomly determines an amount of additional funds to associate with the ticket voucher. In certain such embodiments, the randomly determined amount of additional funds is selected from a predetermined range of amounts, such as between $1 and $5.

In certain embodiments, the determined amount of additional funds is based on the amount of funds associated with the ticket voucher. In one such embodiment, the determined amount of additional funds is a percentage of the amount of funds associated with the ticket voucher, such as 5% of the value of the ticket voucher. In another such embodiment, the determined amount of additional funds is a percentage of the amount of funds associated with the ticket voucher selected from a predetermined range of percentages, such as 1% to 2% of the value of the ticket voucher. In another such embodiment, the determined amount of additional funds is an amount selected based on the amount of funds associated with the ticket voucher, such as $5 if the ticket voucher is valued less than $100 and $10 if the ticket is valued at $100 or more.

In certain embodiments, the determined amount of additional funds is based on one or more aspects of the wagering activity that resulted in the issuance of the ticket voucher. In one such embodiment, the determined amount of additional funds is a percentage of the amount of wagers placed by the player during a gaming session associated with the ticket voucher. In one such embodiment, the determined amount of additional funds is a percentage of the amount won by the player during a gaming session associated with the ticket voucher. In one such embodiment, the determined amount of additional funds is a percentage of the amount of wagers placed by the player during a plurality of gaming sessions, such as gaming sessions that form a current and/or past gaming establishment visit. In one such embodiment, the determined amount of additional funds is a percentage of the amount won by the player during a plurality of gaming sessions, such as gaming sessions that form a current and/or past gaming establishment visit.

In certain embodiments, the determined amount of additional funds is based on an identity of the user holding the ticket voucher. In one such embodiment, the determined amount of additional funds is based on a status, such as a player tracking status, of the holder of the ticket voucher in which the amount of additional funds for the same ticket voucher is different for different users of different statuses. In another such embodiment, the determined amount of additional funds is based on the presence (or lack thereof) of one or more accounts, such as cashless wagering accounts, sporting event wagering accounts and/or gaming establishment retail accounts, associated with the holder of the ticket voucher in which the amount of additional funds for the same ticket voucher is different based on whether or not any accounts are associated with the holder of the ticket voucher.

In certain embodiments, the determined amount of additional funds is based on the circumstances of the ticket voucher being redeemed. In one such embodiment, the determined amount of additional funds is based on when the ticket voucher is being redeemed (e.g., an additional amount of 2% of the value of the ticket voucher if redeemed within two hours of being issued and an additional amount of 1% of the value of the ticket voucher if redeemed after two hours of being issued). In another such embodiment, the determined amount of additional funds is based on where the ticket voucher is being redeemed (e.g., an additional amount of 5% of the value of the ticket voucher if redeemed at an EGM in a high roller room of a casino and an additional amount of 1% of the value of the ticket voucher if redeemed at an EGM elsewhere).

In certain embodiments, the amount of additional funds available in association with the ticket voucher includes a variable award, such as a variable amount of credits, a variable quantity of player tracking points, a variable player tracking point modifier applicable to a quantity of player tracking points subsequently earned by the user, a variable player tracking point modifier applicable to a quantity of player tracking points previously earned by the user, a variable quantity of non-cashable promotional credits usable to fund one or more plays of one or more games of chance, and/or a variable quantity of virtual credits usable for a play of a social or non-wagering game. In certain such embodiments, the variable award is determined based on the results of one or more games of chance (or games of skill) including, but not limited to: a play of any suitable slot game; a play of any suitable wheel game; a play of any suitable card game (including any suitable type of poker game, such as, but not limited to, a multiple hand poker game, Texas Hold'em, Omaha, Three Card Poker, Four Card Poker, Seven Card Stud, Pai Gow Poker, Caribbean Stud Poker, or Let It Ride Poker, as well as other suitable non-poker interactive cards games, such as, but not limited to, blackjack, Baccarat, Spanish 21, Casino War, Super Fun 21, or Vegas Three Card Rummy), a play of any suitable offer and acceptance game; a play of any suitable award ladder game; a play of any suitable puzzle-type game; a play of any suitable persistence game; a play of any suitable selection game; a play of any suitable cascading symbols game; a play of any suitable ways to win game; a play of any suitable scatter pay game; a play of any suitable coin-pusher game; a play of any suitable elimination game; a play of any suitable stacked wilds game; a play of any suitable trail game; a play of any suitable bingo game; a play of any suitable video scratch-off game; a play of any suitable pick-until-complete game; a play of any suitable shooting simulation game; a play of any suitable racing game; a play of any suitable promotional game; a play of any suitable high-low game; a play of any suitable lottery game; a play of any suitable number selection game; a play of any suitable dice game; a play of any suitable skill game; a play of any suitable auction game; a play of any suitable reverse-auction game; a play of any suitable group game; a play of any suitable game in a service window of an EGM; a play of any suitable game on a mobile device; and/or a play of any suitable game of the present disclosure.

In certain embodiments, the parameter of the bonus event includes a type of additional funds to associate with the ticket voucher. In one such embodiment, the type of additional funds is the same as the type of funds associated with the ticket voucher in the ticket voucher database. For example, for cashable funds associated with a ticket voucher, the system determines an amount of additional cashable funds as part of the bonus event. In another such embodiment, the type of additional funds is different from the type of funds associated with the ticket voucher in the ticket voucher database. For example, for cashable funds associated with a ticket voucher, the system determines an amount of non-cashable credits as part of the bonus event. In this example, to deter a player from leaving an EGM after redeeming a ticket voucher associated with a bonus event, the system employs non-cashable credits as part of the bonus event that need to be played through the EGM.

In certain embodiments, alternative from (or in addition to) determining an amount of additional funds for the bonus event realized in association with the redemption of a ticket voucher, the system determines one or more features to activate in association with the bonus event, such as to activate for one or more plays of a game occurring at the EGM where the ticket voucher is being redeemed at. In these embodiments, the features to activate and/or the magnitude of such features is based on one or more of the above-described factors for determining the amount of additional funds. In certain embodiments, the system selects the same feature for each bonus event with the magnitude of the feature changing from bonus event to bonus event. In certain embodiments, the system selects different features for two or more bonus events. In certain embodiments, different features have the same probability of being selected. In certain embodiments, different features have different probabilities of being selected.

In different embodiments, the selected features associated with the bonus event include any feature that results in a modification of one or more components, aspects, or elements of one or more plays of a game, such as the modification of one or more game outcomes of one or more plays of a game (e.g., the symbols evaluated for the play(s) of the game), the modification of the paytable utilized for one or more plays of the game and/or the modification of any award determined for one or more plays of the game. In such different embodiments, the selected features include, but are not limited to: a feature which superimposed one or more symbols over the randomly generated symbols of the reels; a feature which replaces one or more symbols of the randomly generated symbols of the reels with a predetermined symbol pattern; a feature which replaces one or more symbols of the randomly generated symbols of the reels with a predetermined pattern of wild symbols; a modifier, such as a multiplier, feature; a book-end wild symbols feature; a stacked wild symbols feature; an expanding wild symbols feature; a nudging wild symbols feature; a feature modifying a quantity of wild symbols available to be generated; a retrigger symbol feature; an anti-terminator symbol feature; a locking reel feature; an expanding reel feature; a locking symbol position feature; a feature modifying a placed wager amount; a feature modifying a placed side wager amount; a feature modifying a number of wagered on paylines; a feature modifying a wager placed on one or more paylines (or on one or more designated paylines); a feature modifying a number of ways to win wagered on; a feature modifying a wager placed on one or more ways to win (or on one or more designated ways to win); a feature modifying a paytable utilized for a play of a game; a feature modifying an average expected payback percentage of a play of a game; a feature modifying an average expected payout of a play of a game; a feature modifying one or more awards available; a feature modifying a range of awards available; a feature modifying a type of awards available; a feature modifying one or more progressive awards; a feature modifying which progressive awards are available to be won; a feature modifying one or more modifiers, such as multipliers, available; a feature modifying an activation of a reel (or a designated reel); a feature modifying an activation of a plurality of reels; a feature modifying a generated outcome (or a designated generated outcome); a feature modifying a generated outcome (or a designated generated outcome) associated with an award over a designated value; a feature modifying a generated outcome (or a designated generated outcome) on a designated payline; a feature modifying a generated outcome (or a designated generated outcome) in a scatter configuration; a feature modifying a winning way to win (or a designated winning way to win); a feature modifying a designated symbol or symbol combination; a feature modifying a generation of a designated symbol or symbol combination on a designated payline; a feature modifying a generation of a designated symbol or symbol combination in a scatter configuration; a feature modifying an amount of free spins provided; a feature modifying a game terminating or ending bonus event condition; a feature modifying how one or more aspects of one or more games (e.g., colors, speeds, sound) are displayed; and/or a feature modifying any game play feature associated with any play of any game of the present disclosure.

It should be appreciated that in these embodiments, one or more plays of one or more games of chance (or games of skill), one or more activated or modified features, and/or one or more entries into one or more drawings may or may not result in an award. That is, while such bonus events associated with such redeemed ticket vouchers have an average expected value (i.e., a theoretical value which is based on the awards available and the probability of obtaining any of such awards), one or more determinations subsequently occur in association with the bonus event and an actual value of the award of the bonus event associated with the redeemed ticket voucher is based on the results of such determinations.

In certain embodiments, the parameter of the bonus event includes when to determine a benefit realized in association with the redemption of the ticket voucher. In one such embodiment, the benefit (e.g., an amount of additional funds to associate with the ticket voucher) is determined when the ticket voucher is redeemed. In another embodiment, the benefit is determined prior to the ticket voucher being redeemed (such that the potential benefit may be printed on the ticket voucher or otherwise conveyed to the holder of the ticket voucher). In another embodiment, the benefit is determined after the ticket voucher is redeemed. In this embodiment, the system determines the benefit and funds an account associated with the holder of the ticket voucher with the benefit.

In certain embodiments, the parameter of the bonus event includes any additional inputs associated with the triggering of the bonus event and/or the benefit realized in association with the redemption of the ticket voucher. In one such embodiment, the system identifies players who might be eligible for the ticket voucher bonus event. In this embodiment, the system then prompts an operator to decide the eligibility and benefit realized (and/or benefit terms) before triggering the bonus event in association with a redemption of the ticket voucher. In another such embodiment in which the type of funds associated with the ticket voucher may be different than the type of funds associated with the ticket voucher in the ticket voucher database, when the player inserts a ticket voucher, the system prompts the player, such as via a displayed service window, if they would like to redeem the ticket voucher as an alternative type of funds. For example, the system prompts the player to determine if the player wants to convert all of the amount represented by the redeemed ticket voucher to a non-cashable amount which corresponds to the original amount of the ticket voucher plus an additional amount of non-cashable funds (that would be transferred to the EGM from the system).

In certain embodiments, following the triggering of a bonus event previously associated with a ticket voucher and the providing of any determined benefit or following the triggering of a bonus event with a ticket voucher not previously associated with any bonus events and the providing of any determined benefit, the system utilizes (or causes a ticket voucher system to utilize) the above-described ticket voucher identifying information in the ticket voucher database to redeem the ticket voucher and causes the ticket voucher database to be updated based on the redemption of the ticket voucher and the associated bonus event.

Figure 2A:
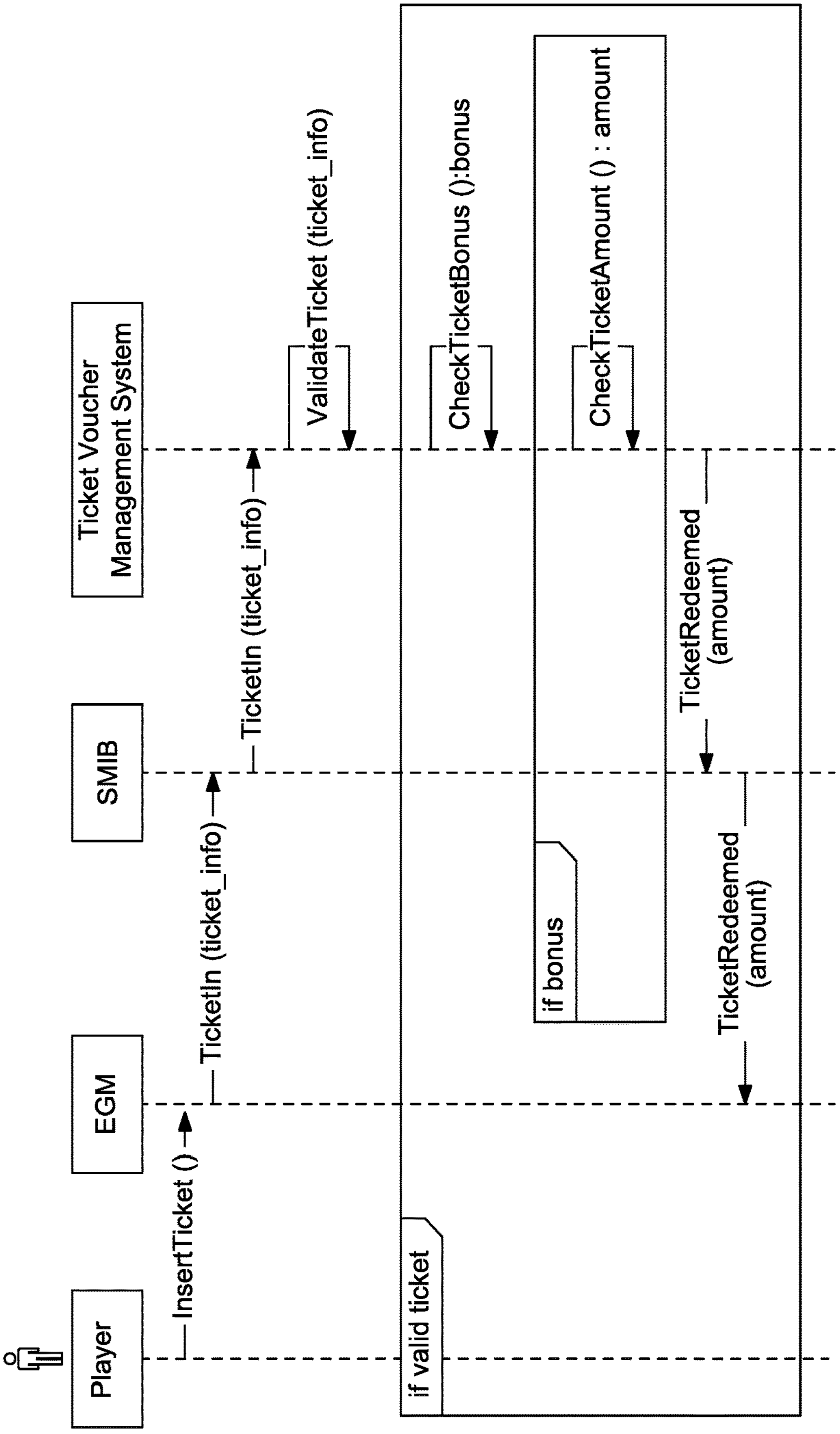
FIG. 2A is a flow chart of an example process for operating a system which enables a bonus event to be triggered in association with redemption of a ticket voucher.

Accordingly, in certain embodiments, in association with a redemption of a ticket voucher, one or more components operate together to potentially cause an amount provided in association with a redemption of a ticket voucher to be different than the amount otherwise associated with the ticket voucher in a ticket voucher database. For example, as seen in FIG. 2A, following a receipt of a ticket voucher by an EGM, a component of a gaming establishment patron management system associated with the EGM (e.g., a SMIB) operates with one or more components of a ticket voucher management system to determine the applicability of any bonus event with the redeemed ticket voucher and if applicable, modify the amount associated with the ticket voucher based on the bonus event. In another embodiment that proceeds independent of any component of a gaming establishment patron management system (e.g., a SMIB) associated with any EGM, following a receipt of a ticket voucher by an EGM, the EGM operates with one or more components of a ticket voucher management system to determine the applicability of any bonus event with the redeemed ticket voucher and if applicable, modify the amount associated with the ticket voucher based on the bonus event. In one variation of these different embodiments, the component of the ticket voucher management system adjusts the amount of the ticket stored in the ticket voucher database based on the occurrence of the bonus event. In another variation of these different embodiments, the component of the ticket voucher management system retains the amount of the ticket stored in the ticket voucher database (i.e., a "TicketRedeemed" message from the component of the ticket voucher management system to the SMIB provides the face value of the ticket voucher) and an additional amount associated with the occurrence of the bonus event is provided separately (i.e., the bonus amount is awarded via a separate message, such as a message that causes the SMIB to perform a slot accounting system ("SAS") automated funds transfer to the EGM or a SAS legacy bonus transfer to the EGM.

Figure 2B:
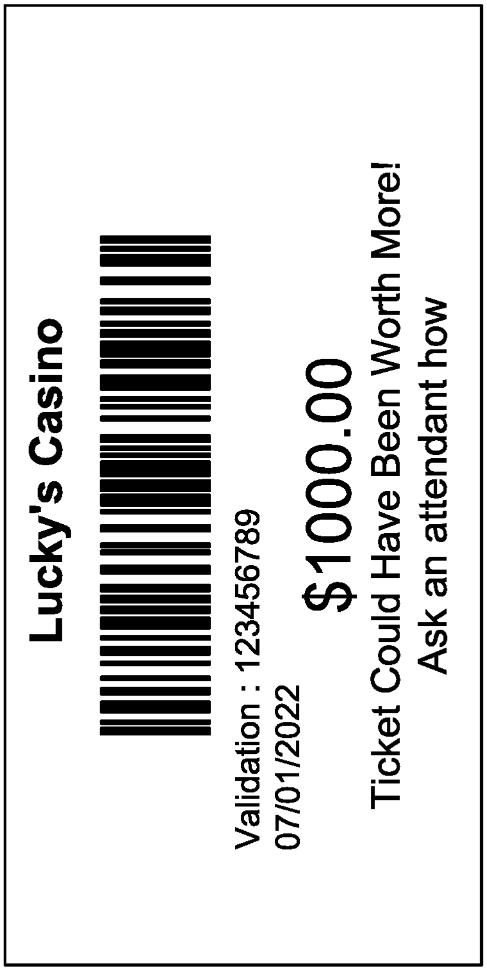
FIG. 2B is an example ticket voucher that includes information regarding a missed bonus event opportunity.

In certain embodiments, the system utilizes the bonus events associated with one or more ticket vouchers to potentially incentivize certain holders of ticket vouchers to take one or more actions (or not take one or more actions). In one such embodiment in which the bonus events of the present disclosure are available for carded players only (i.e., players enrolled in a player tracking program), the system employs the ticket vouchers to try and cause such players to enroll in the player tracking system. For example, as seen in FIG. 2B, the system causes messaging to be printed on the ticket voucher that reflects the missed opportunity to potentially receive a benefit (in general or a specific amount the user did not realize) via the redemption of a ticket voucher. In another such embodiment in which the bonus events of the present disclosure are available for carded players only, the system employs various messaging (that is independent of the ticket voucher itself) to try and cause such players to enroll in the player tracking system. For example, the system causes information associated with the missed opportunity to potentially receive a benefit (in general or a specific amount) via the redemption of a ticket voucher to be conveyed by the system sending an electronic message to the holder of the ticket voucher (e.g., text/SMS message, an e-mail and/or a notification to a mobile application being executed by a mobile device). In another embodiment, the system utilizes an externally controlled interface, such as a service window displayed by an EGM or a display device associated with a component of a gaming establishment patron management system, to display information about the missed opportunity to potentially receive a benefit (in general or a specific amount) via the redemption of a ticket voucher. In another embodiment, the holder of the ticket voucher learns about such a missed opportunity by the system associating such information with a machine readable code available via scanning the ticket voucher. In another embodiment, the holder of the ticket voucher learns about such a lost opportunity responsive to the ticket voucher being received by a gaming establishment device, such as a kiosk, that displays such information to the holder of the ticket voucher. In these different embodiments, any relevant information associated with the missed opportunity as well as an interface to potentially enroll in the player tracking system may be included in any messaging displayed to or sent to the holder of the ticket voucher.

In another embodiment of utilizing the bonus events associated with one or more ticket vouchers to potentially incentivize certain holders of ticket vouchers to take one or more actions (or not take one or more actions), if the system determines that a player has terminated a gaming session based on a relative negative experience, such as the system determining that the player is on a losing streak or had a near miss outcome and then they cashed out, the system associates a bonus event with the ticket voucher to incentivize the player to keep playing. For example, if the system determines, based on a player's gaming session and/or certain biometric data of the player, that a player qualifies as "rage quitter" who unexpectedly terminated a gaming session at an EGM, the system causes information associated the benefit of the bonus event to be conveyed by printing such information on the ticket voucher (e.g., printing a message such as "Insert this ticket in the next minute and it is worth more") and/or causing the EGM (and/or a mobile device) to display such information. In certain embodiments, the benefit of the bonus event is realizable at another EGM, and/or after a designated period of time (e.g., a twenty minute cooling off period).

Accordingly, in association with a user procuring a ticket voucher and/or redeeming a ticket voucher, the system determines any bonus events to associate with that ticket voucher. Such bonus events, if ultimately triggered, enable the holder of the ticket voucher to realize a benefit that potentially exceeds the value associated with the ticket voucher. Such a configuration of offering zero, one or more benefits in association with the employment of ticket vouchers provides a relatively more secure environment for a user (via reducing or eliminating a user carrying cash on their person and thus diminishing the risks that such cash may be lost or stolen) and overcomes various health concerns associated with cash-based transactions (e.g., protecting patrons from using forms of currency that act as transmission vehicles for contagions). Moreover, a reduction in cash-based transactions reduces computational resources otherwise dedicated to sorting, counting and processing such cash, leading to energy savings as components tasked with sorting, counting and processing such cash are used less. Accordingly, since certain gaming establishment patrons are uncomfortable with large amounts of cash in a gaming establishment, the system incentivizes the use of ticket vouchers (without the need to handle cash) thereby realizing various advantages not available from prior systems.

It should be appreciated that in different embodiments, one or more of: whether to associate a bonus event with a ticket voucher, whether to trigger a bonus event associated with a ticket voucher, one or more attributes of a bonus event associated with a ticket voucher, any conditions that need to be satisfied prior to a triggering of a bonus event associated with a ticket voucher, any limitations on a bonus event associated with a ticket voucher, one or more benefits realized from a bonus event associated with a ticket voucher, and/or any determination of the present disclosure is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the system, determined independent of a random determination at the system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations of the present disclosure, determined independent of any other determination of the present disclosure or determined based on any other suitable method or criteria.

It should be further appreciated that the above-described embodiments of the present disclosure may be implemented in accordance with or in conjunction with one or more of a variety of different types of systems, such as, but not limited to, those described below.

The present disclosure contemplates a variety of different systems each having one or more of a plurality of different features, attributes, or characteristics. A "system" as used herein refers to various configurations of: (a) one or more servers; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the system of the present disclosure includes: (a) one or more electronic gaming machines in combination with one or more servers; (b) one or more personal gaming devices in combination with one or more servers; (c) one or more personal gaming devices in combination with one or more electronic gaming machines; (d) one or more personal gaming devices, one or more electronic gaming machines, and one or more servers in combination with one another; (e) a single electronic gaming machine; (f) a plurality of electronic gaming machines in combination with one another; (g) a single personal gaming device; (h) a plurality of personal gaming devices in combination with one another; (i) a single server; and/or (j) a plurality of servers in combination with one another. For brevity and clarity and unless specifically stated otherwise, "EGM" as used herein represents one EGM or a plurality of EGMs, "personal gaming device" as used herein represents one personal gaming device or a plurality of personal gaming devices, and "server" as used herein represents one server or a plurality of servers.

As noted above, in various embodiments, the system includes an EGM (or personal gaming device) in combination with a server. In such embodiments, the EGM (or personal gaming device) is configured to communicate with the server through a data network or remote communication link. In certain such embodiments, the EGM (or personal gaming device) is configured to communicate with another EGM (or personal gaming device) through the same data network or remote communication link or through a different data network or remote communication link.

In certain embodiments in which the system includes an EGM (or personal gaming device) in combination with a server, the server is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the server. The at least one processor of that EGM (or personal gaming device) is configured to execute the events, messages, or commands represented by such data or signals in conjunction with the operation of the EGM (or personal gaming device). Moreover, the at least one processor of the server is configured to transmit and receive data or signals representing events, messages, commands, or any other suitable information between the server and the EGM (or personal gaming device). The at least one processor of the server is configured to execute the events, messages, or commands represented by such data or signals in conjunction with the operation of the server. One, more than one, or each of the functions of the server may be performed by the at least one processor of the EGM (or personal gaming device). Further, one, more than one, or each of the functions of the at least one processor of the EGM (or personal gaming device) may be performed by the at least one processor of the server.

In certain such embodiments, as indicated above, computerized instructions for controlling any games (such as any primary or base games and/or any secondary or bonus games) displayed by the EGM (or personal gaming device) are executed by the server. In such "thin client" embodiments, the server remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling certain games displayed by the EGM (or personal gaming device) are communicated from the server to the EGM (or personal gaming device) and are stored in at least one memory device of the EGM (or personal gaming device). In such "thick client" embodiments, the at least one processor of the EGM (or personal gaming device) executes the computerized instructions to control such games (or other suitable interfaces) displayed by the EGM (or personal gaming device).

In various embodiments in which the system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the system includes an EGM (or personal gaming device) and a server, computerized instructions for controlling any primary or base games displayed by the EGM (or personal gaming device) are communicated from the server to the EGM (or personal gaming device) in a thick client configuration, and computerized instructions for controlling any secondary or bonus games or other functions displayed by the EGM (or personal gaming device) are executed by the server in a thin client configuration.

In certain embodiments in which the system includes: (a) an EGM (or personal gaming device) configured to communicate with a server through a data network; and/or (b) a plurality of EGMs (or personal gaming devices) configured to communicate with one another through a data network, the data network is a local area network (LAN) in which the EGMs (or personal gaming devices) are located substantially proximate to one another and/or the server. In one example, the EGMs (or personal gaming devices) and the server are located in a gaming establishment or a portion of a gaming establishment.

In other embodiments in which the system includes: (a) an EGM (or personal gaming device) configured to communicate with a server through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the server. For example, one or more of the EGMs (or personal gaming devices) are located: (a) in an area of a gaming establishment different from an area of the gaming establishment in which the server is located; or (b) in a gaming establishment different from the gaming establishment in which the server is located. In another example, the server is not located within a gaming establishment in which the EGMs (or personal gaming devices) are located. In certain embodiments in which the data network is a WAN, the system includes a server and an EGM (or personal gaming device) each located in a different gaming establishment in a same geographic area, such as a same city or a same state. Systems in which the data network is a WAN are substantially identical to systems in which the data network is a LAN, though the quantity of EGMs (or personal gaming devices) in such systems may vary relative to one another.

In further embodiments in which the system includes: (a) an EGM (or personal gaming device) configured to communicate with a server through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the server identifies a player before enabling that player to place any wagers on any plays of any wagering games. In one example, the server identifies the player by requiring a player account of the player to be logged into via an input of a unique username and password combination assigned to the player. The server may, however, identify the player in any other suitable manner, such as by validating a player tracking identification number associated with the player; by reading a player tracking card or other smart card inserted into a card reader (as described below); by validating a unique player identification number associated with the player by the server; or by identifying the EGM (or personal gaming device), such as by identifying the MAC address or the IP address of the Internet facilitator. In various embodiments, once the server identifies the player, the server enables placement of one or more wagers on one or more plays of one or more primary or base games and/or one or more secondary or bonus games, and displays those plays via the Internet browser of the EGM (or personal gaming device).

The server and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Figure 3:
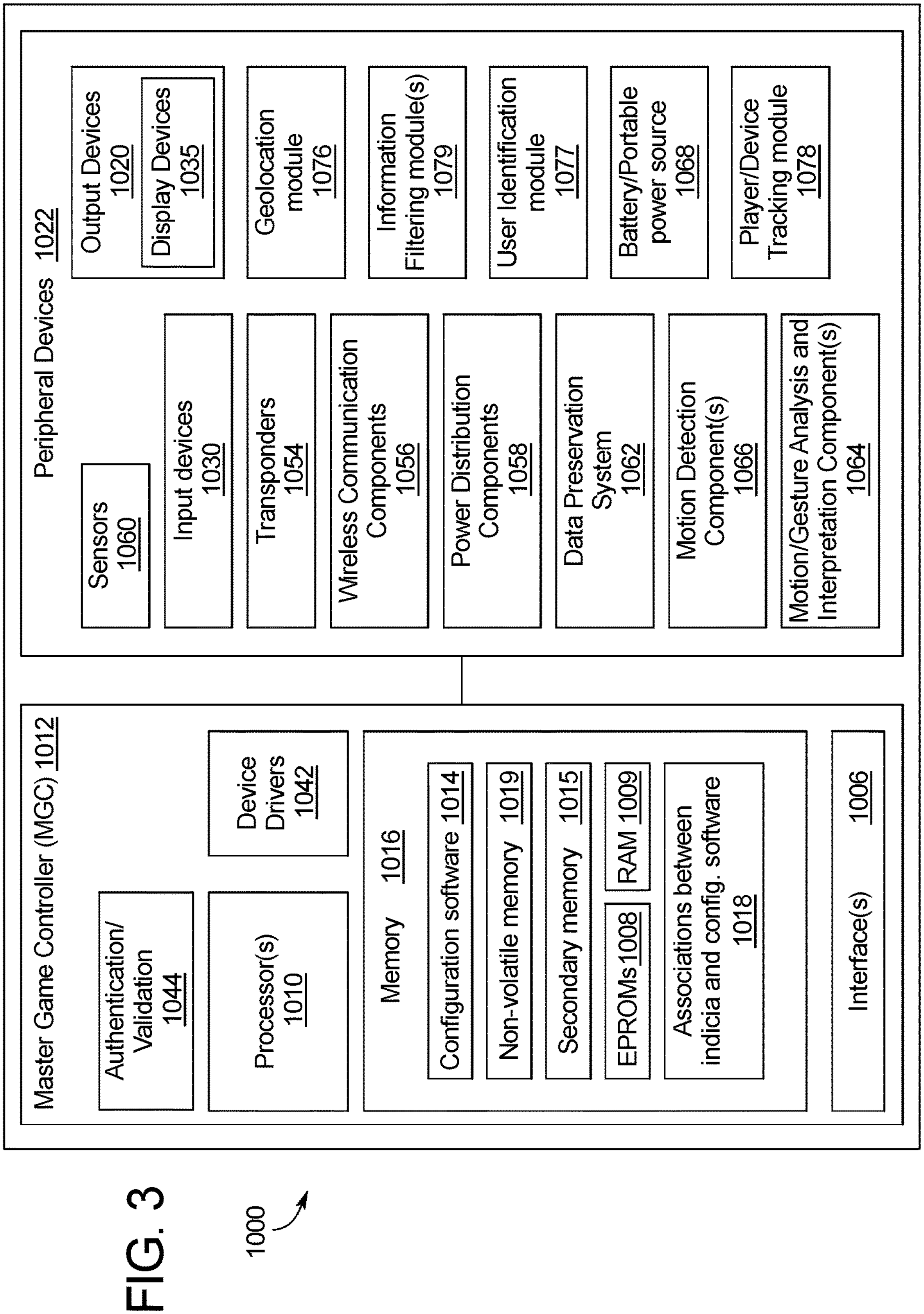
FIG. 3 is a schematic block diagram of one embodiment of an electronic configuration of an example electronic gaming machine of the present disclosure.
Figure 4A:
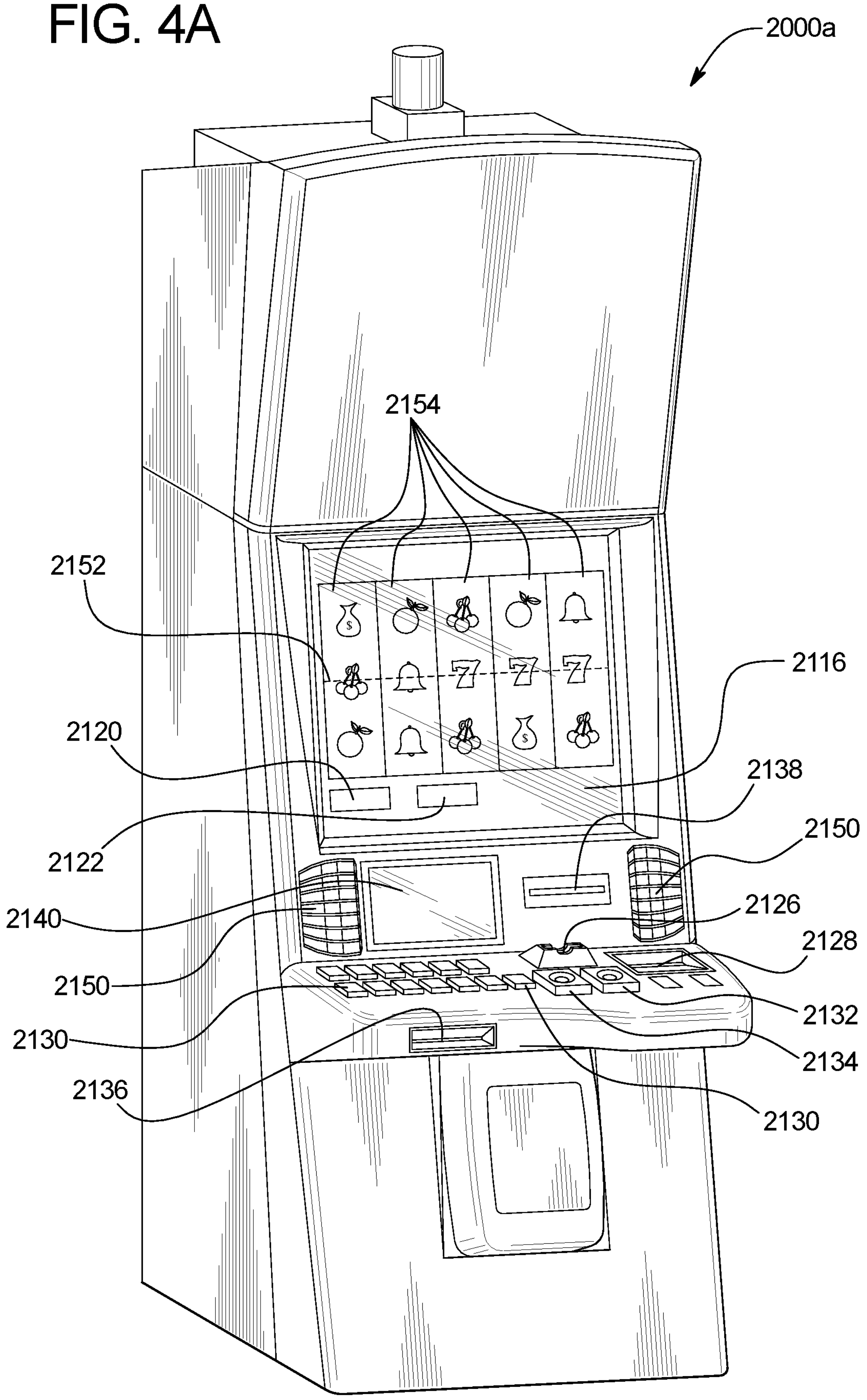
FIGS. 4A and 4B are perspective views of example alternative embodiments of electronic gaming machines of the present disclosure.
Figure 4B:
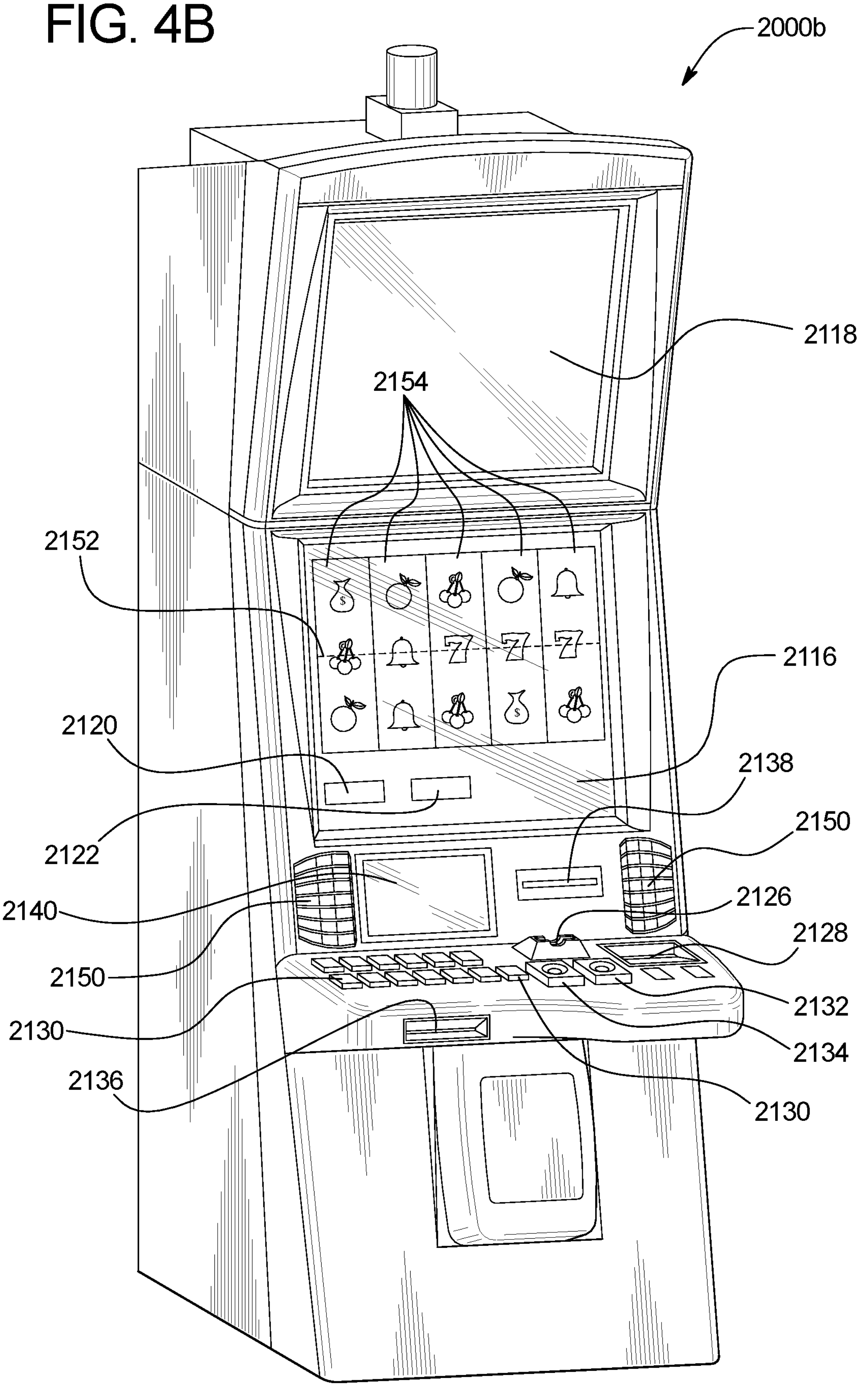
Figure 4C:
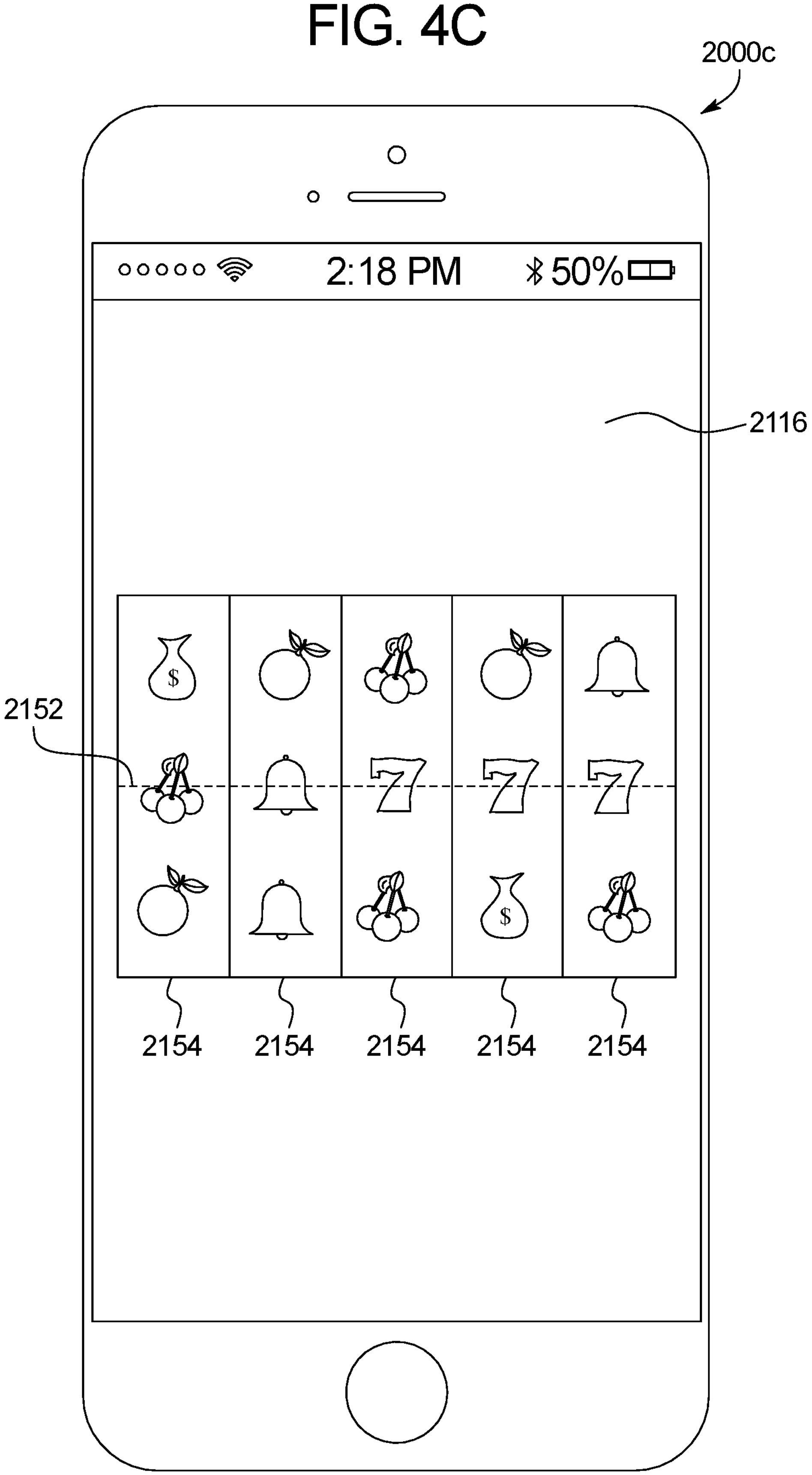
FIG. 4C is a front view of an example personal gaming device of the present disclosure.

FIG. 3 is a block diagram of an example EGM 1000 and FIGS. 4A and 4B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 4C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a “circuit,” “module,” “component,” or “system.” Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the “C” programming language, Visual Basic, Fortran 2003, Perl, COBOL 2002, PHP, ABAP, dynamic programming languages such as Python, Ruby and Groovy, or other programming languages. The program code may execute entirely on the user’s computer, partly on the user’s computer, as a stand-alone software package, partly on the user’s computer and partly on a remote computer or entirely on the remote computer or server. In the latter scenario, the remote computer may be connected to the user’s computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 4A includes a central display device 2116, a player tracking display 2140, a credit display 2120, and a bet display 2122. The example EGM 2000*b* illustrated in FIG. 4B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 4A and 4B each include a ticket printer and dispenser 2136.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 4A and 4B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 4A and 4B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 4A and 4B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 4A and 4B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 4A and 4B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 4A and 4B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 4A and 4B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 4A and 4B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all systems, and these example EGMs may not include one or more elements that are included in other systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the system includes a server and a changeable EGM, the at least one memory device of the server stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the server is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the server to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the system generates the game outcome(s) and/or the award(s) to be provided based on the associated probabilities. In these embodiments, since the system generates game outcomes and/or awards randomly or based on one or more probability calculations, there is no certainty that the system will ever provide any specific game outcome and/or award.

In certain embodiments, the system maintains one or more predetermined pools or sets of predetermined game outcomes and/or awards. In certain such embodiments, upon generation or receipt of a game outcome and/or award request, the system independently selects one of the predetermined game outcomes and/or awards from the one or more pools or sets. The system flags or marks the selected game outcome and/or award as used. Once a game outcome or an award is flagged as used, it is prevented from further selection from its respective pool or set; that is, the system does not select that game outcome or award upon another game outcome and/or award request. The system provides the selected game outcome and/or award.

In certain embodiments, the system determines a predetermined game outcome and/or award based on the results of a bingo, keno, or lottery game. In certain such embodiments, the system utilizes one or more bingo, keno, or lottery games to determine the predetermined game outcome and/or award provided for a primary game and/or a secondary game. The system is provided or associated with a bingo card. Each bingo card consists of a matrix or array of elements, wherein each element is designated with separate indicia. After a bingo card is provided, the system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the primary game is a slot or spinning reel type game, the system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the system. In certain such embodiments, the system includes one or more paylines associated with the reels. The example EGM **2000*b* shown in FIG. 4B includes a payline 2152 and a plurality of reels 2154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The system enables a wager to be placed on one or more of such paylines to activate such paylines. In other embodiments in which one or more paylines are formed between at least two adjacent symbol display areas, the system enables a wager to be placed on a plurality of symbol display areas, which activates those symbol display areas.

In various embodiments, the system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the system includes a progressive award. Typically, a progressive award includes an initial amount and an additional amount funded through a portion of each wager placed to initiate a play of a primary game. When one or more triggering events occurs, the system provides at least a portion of the progressive award. After the system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the system automatically provides or initiates the secondary game upon the occurrence of a triggering event or the satisfaction of a qualifying condition. In other embodiments, the system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the system includes one or more player tracking systems. Such player tracking systems enable operators of the system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the system to begin a gaming session, the card reader reads the player identification number off the player tracking card to identify the player. The system timely tracks any suitable information or data relating to the identified player's gaming session. The system also timely tracks when the player tracking card is removed to conclude play for that gaming session. In another embodiment, rather than requiring insertion of a player tracking card into the card reader, the system utilizes one or more portable devices, such as a mobile phone, a radio frequency identification tag, or any other suitable wireless device, to track when a gaming session begins and ends. In another embodiment, the system utilizes any suitable biometric technology or ticket technology to track when a gaming session begins and ends.

In such embodiments, during one or more gaming sessions, the system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In various embodiments, the system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination (or in any other manners described above.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer or by initiating creation of a paper check that is mailed to the player.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the system includes a geo-fence system that enables tethered game play within a particular geographic area but not outside of that geographic area.

In certain embodiments, the system is configured to communicate with a social network server that hosts or partially hosts a social networking website via a data network (such as the Internet) to integrate a player's gaming experience with the player's social networking account. This enables the system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the system to receive certain information from the social network server, such as the player's likes or dislikes or the player's list of connections. In certain embodiments, the system enables the player to link the player's player account to the player's social networking account(s). This enables the system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the system enables the player to recommend a game to the player's connections by posting a recommendation to the player's wall (or other suitable area) of the social networking website.

Certain of the systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary, a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A system comprising:
a processor; and
a memory device that stores a plurality of instructions that, when executed by the processor, cause the processor to:
determine whether to associate a bonus event with a ticket voucher, wherein the bonus event is realizable after a designated period of time,
responsive to the determination being to associate the bonus event with the ticket voucher and responsive to a receipt of data associated with a request to issue the ticket voucher associated with a first amount of funds after the designated period of time:
determine a benefit,
cause a database to store, in association with the ticket voucher, data associated with each of the bonus event and the first amount of funds, and
cause the ticket voucher to be issued, and
responsive to the determination being to associate the bonus event with the ticket voucher and responsive to a receipt of data associated with the request to issue the ticket voucher associated with the first amount of funds prior to the designated period of time:
cause the database to store data associated the first amount of funds in association with the ticket voucher, and
cause the ticket voucher to be issued.

2. The system of claim 1, wherein the determination to associate the bonus event with the ticket voucher is based on a gaming activity prior to the receipt of data associated with the request to issue the ticket voucher.

3. The system of claim 1, wherein the determination to associate the bonus event with the ticket voucher is based on at least one of a random determination, the first amount of funds associated with the ticket voucher, and an identity of a holder of the ticket voucher.

4. The system of claim 1, wherein the determination to associate the bonus event with the ticket voucher is based on a satisfaction of a condition associated with the request to issue the ticket voucher.

5. The system of claim 4, wherein the condition comprises at least one of a location of the request to issue the ticket voucher, a time of the request to issue the ticket voucher, and an identity of a holder of the ticket voucher.

6. The system of claim 1, wherein the memory devices stores a plurality of further instructions that, when executed by the processor responsive to the determination to associate the bonus event with the ticket voucher, cause the processor to cause information associated with the bonus event to be displayed in association with the ticket voucher.

7. The system of claim 1, wherein prior to the ticket voucher being redeemed, the benefit comprises an average expected amount.

8. The system of claim 1, wherein the memory devices stores a plurality of further instructions that, when executed by the processor responsive to the determination to associate a bonus event with the ticket voucher, cause the processor to randomly determine the benefit.

9. The system of claim 1, wherein the determination of the benefit is based on the first amount of funds associated with the ticket voucher.

10. A system comprising:

a processor; and a memory device that stores a plurality of instructions that, when executed by the processor responsive to a receipt of data associated with a request to issue a ticket voucher associated with a first amount of funds, cause the processor to:

responsive to a determination to associate a bonus event with the ticket voucher and a satisfaction of a condition independent of the determination to associate the bonus event with the ticket voucher:

determine a benefit, cause a database to store, in association with the ticket voucher, data associated with each of the bonus event and the first amount of funds, and cause the ticket voucher to be issued, and responsive to the determination to associate the bonus event with the ticket voucher and no satisfaction of the condition:

cause the database to store data associated the first amount of funds in association with the ticket voucher, and cause the ticket voucher to be issued.

11. The system of claim 10, wherein the satisfaction of the condition is based on a holder of the ticket voucher qualifying to receive any benefits.

12. A method of operating a system, the method comprising:

determining, by a processor, whether to associate a bonus event with a ticket voucher, wherein the bonus event is realizable after a designated period of time, responsive to a receipt of data associated with a request to issue the ticket voucher associated with a first amount of funds and responsive to the determination being to associate the bonus event with the ticket voucher and after the designated period of time:

determining, by the processor, a benefit, causing a database to store, in association with the ticket voucher, data associated with each of the bonus event and the first amount of funds, and causing the ticket voucher to be issued, and responsive to a receipt of data associated with the request to issue the ticket voucher associated with the first amount of funds prior to the designated period of time and responsive to the determination being to associate the bonus event with the ticket voucher:

causing the database to store data associated the first amount of funds in association with the ticket voucher, and causing the ticket voucher to be issued.

13. The method of claim 12, wherein the determination to associate the bonus event with the ticket voucher is based on a gaming activity prior to the receipt of data associated with the request to issue the ticket voucher.

14. The method of claim 12, wherein the determination to associate the bonus event with the ticket voucher is based on at least one of a random determination, the first amount of funds associated with the ticket voucher, and an identity of a holder of the ticket voucher.

15. The method of claim 12, wherein the determination to associate the bonus event with the ticket voucher is based on a satisfaction of a condition associated with the request to issue the ticket voucher.

16. The method of claim 15, wherein the condition comprises at least one of a location of the request to issue the ticket voucher, a time of the request to issue the ticket voucher, and an identity of a holder of the ticket voucher.

17. The method of claim 12, further comprising, responsive to the determination to associate the bonus event with the ticket voucher, causing information associated with the bonus event to be displayed in association with the ticket voucher.

18. The method of claim 12, wherein prior to the ticket voucher being redeemed, the benefit comprises an average expected amount.

19. The method of claim 12, further comprising, responsive to the determination to associate a bonus event with the ticket voucher, randomly determining, by the processor, the benefit.

20. The method of claim 12, wherein the determination of the benefit is based on the first amount of funds associated with the ticket voucher.

* * * * *